United States Patent [19]
Montagner

[11] Patent Number: 6,095,646
[45] Date of Patent: Aug. 1, 2000

[54] DEVICE, PARTICULARLY REDUCED, FOR THE ELASTICIZING OF ONE EAR-PIECE FOR SPECTACLES

[76] Inventor: Luciano Montagner, Viale Italia 16, Segusino, Italy, I-31040

[21] Appl. No.: 09/194,582
[22] PCT Filed: May 13, 1997
[86] PCT No.: PCT/IT97/00108
  § 371 Date: Jul. 7, 1999
  § 102(e) Date: Jul. 7, 1999
[87] PCT Pub. No.: WO97/45764
  PCT Pub. Date: Dec. 4, 1997

[30] Foreign Application Priority Data

May 31, 1996 [IT] Italy ................................. TV96A0070

[51] Int. Cl.[7] .......................................................... G02C 5/22
[52] U.S. Cl. ................................ 351/153; 351/113; 16/228
[58] Field of Search ....................................... 351/113, 153; 16/228

[56] References Cited

U.S. PATENT DOCUMENTS 5,745,209   4/1998   Khantzis ................................. 351/153

*Primary Examiner*—Huy Mai
*Attorney, Agent, or Firm*—Wenderoth, Lind & Ponack, L.L.P.

[57] ABSTRACT

A bi-elastic device for the elasticizing of ear-pieces for spectacles, comprising a small box that is combined with the ear-piece by spot-welding and pre-assembly. Inside the small box are housed at least two springs, each of the springs on one side having an end in abutment on the small box, and on the other side having the other end in abutment of an end of a tie-rod. The tie-rod is substantially "L" like and the springs are placed adjacent and parallel to the end of the tie-rod. The opposite end of the same tie-rod is external to the small box, and is hingeable to a corresponding small front face provided on a frame of the spectacles.

18 Claims, 3 Drawing Sheets

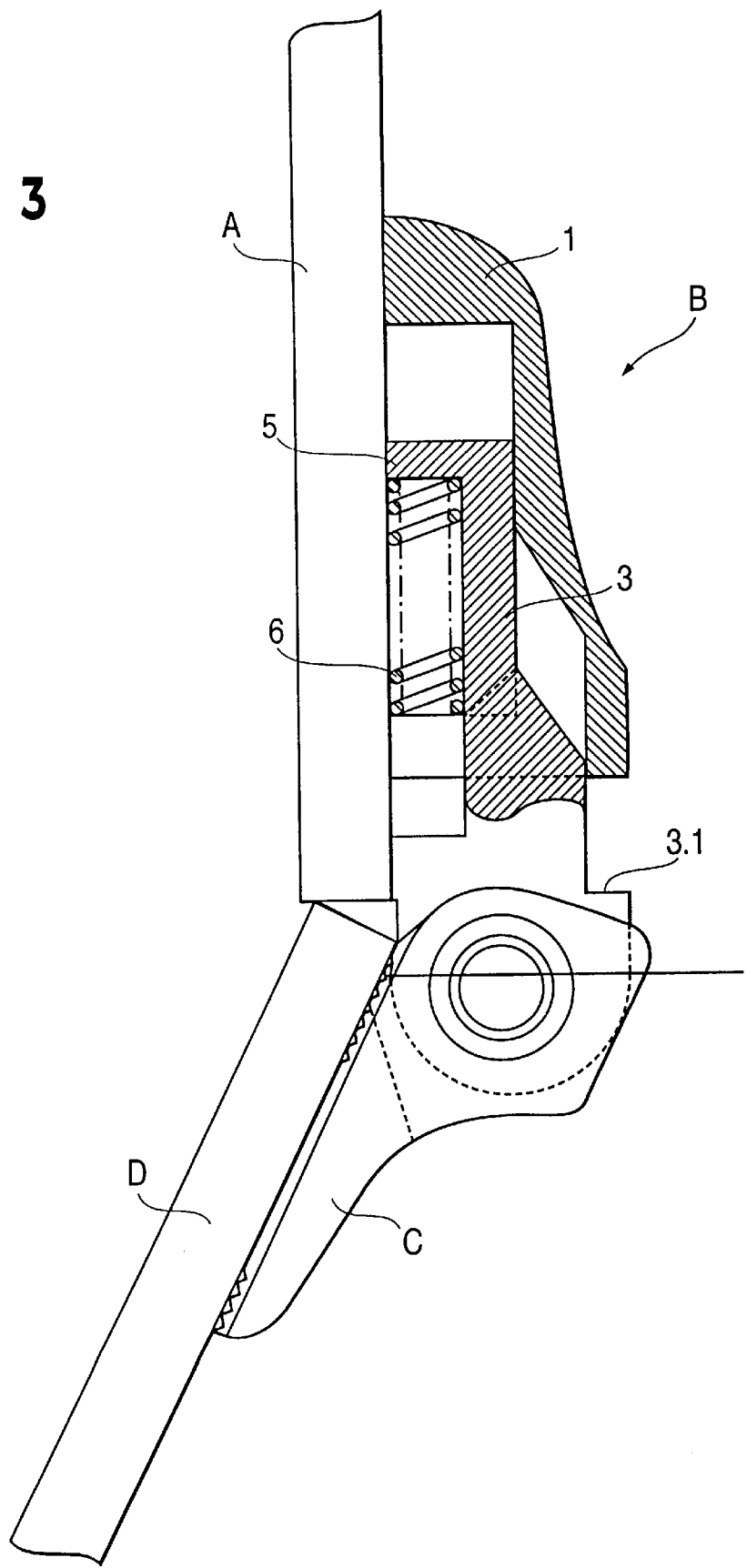

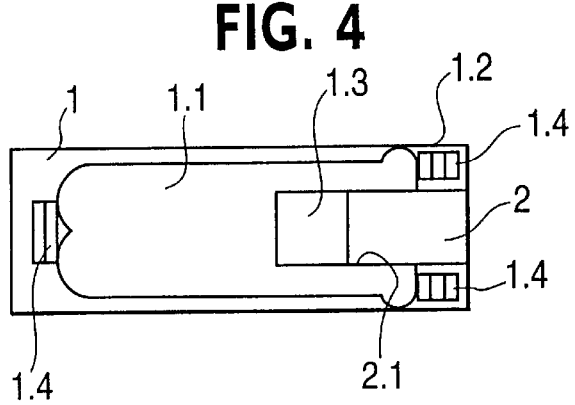
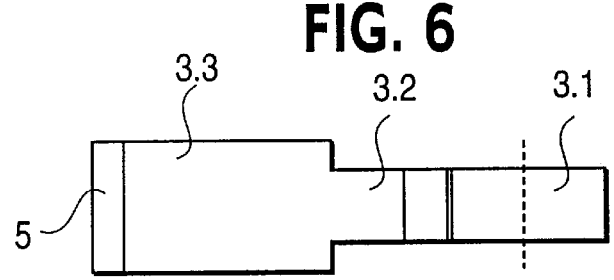
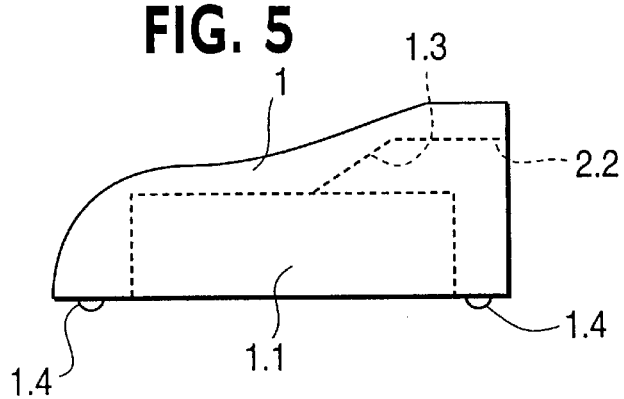
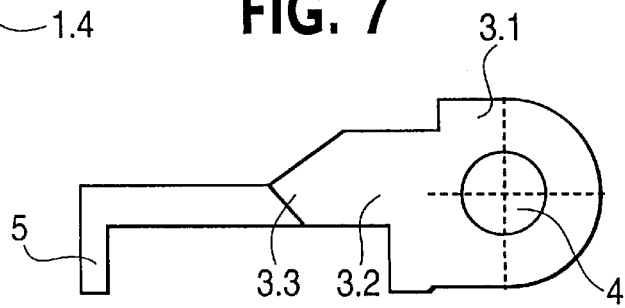

DEVICE, PARTICULARLY REDUCED, FOR THE ELASTICIZING OF ONE EAR-PIECE FOR SPECTACLES

BACKGROUND OF THE INVENTION

1. Technical Field

The object of this invention is an improvement of a bi-elastic device, particularly for the elasticizing of an ear-piece for spectacles. The innovation finds particular, if not exclusive, application in the field of spectacles production, including small metal parts and their fittings.

2. Background Art

It is known that many frames for spectacles are found in the prior art. Some of these frames have devices located close to their hinging for allowing the elastic fastening of ear-pieces to a part of the frame known as a front face. Having such a device located on both sides of the spectacles has the advantage of giving a better fit, because if the ear-pieces exert a low pressure on a person's temples, they are easier to endure by most people, and the spectacles are more adaptable to the different anatomical shapes of each subject. Therefore, the firms in this field are constantly attempting to find innovative and improved solutions, both with regard to function and size of these devices, when compared to the preexisting devices.

For example, a traditional elasticized ear-piece, that found wide acceptance among consumers is disclosed in the European patent application n.79400087.7, in which an elastic hinge was described for a spectacles frame. The elastic hinge comprises a box associated sideways to the ear-piece, the box containing a tie-rod coaxial to the box, and in which an end portion of the tie-rod is threaded, on which is screwed a bushing that ensures the positioning of a spring, while the other side of the tie-rod is in abutment on the inside of a seat in the box.

Another system, conceptually based on the solution provided by the previous patent, is disclosed in the utility model n.181221, which has an improved hinge for the articulation of a spectacles frame with an elastically openable ear-piece. A squared support is provided in the frame, on which is inserted a support which is also squared that makes up a shoulder for the compression of a spring.

Finally, the Italian Patent n. 1 147 198 discloses an ear-piece for spectacles with an elastic hinging in which an end of the ear-piece has an axially holed small block within which is inserted one end for the connection of the hinge. Continuing with a reduced diameter, it supports a sharp edge that is fixed inside the borehole while on the back of the borehole is a tension helicoidal spring blocked at an end by a threaded locknut. In such a case, it is possible for the elastic opening of the ear-piece to achieve a certain angle by an elastic yielding of the hinge-like connection.

The common drawbacks noticed in the above-mentioned solutions include excessive complexity of the utilized devices and a total oversizing of the device. Furthermore, notwithstanding that the above-mentioned devices may perform their functions perfectly, they have many problems during the manufacturing phase, such as the manufacturing of the many precision components, as well as their assembly, each considerably influencing the manufacturing time and cost. Therefore, a main purpose of the firms of the field has been to obtain elasticizing devices for ear-pieces that are smaller in size, offer good functionality while at the same time reducing the number of components, and decrease the assembly time and costs.

In the numerous recent devices on the market that are more or less effective and in line with the above mentioned principles, there is a solution in which the articulation is an ear-piece with a sliding body containing an elasticizing spring. In more detail, the body has a square cross section, in which some material has been removed longitudinally from one part of the body to another to obtain opposite thin sheets which define a guide seat, and make up containing walls of a spring. On one side, the spring is placed in abutment on the seat, while on the other, the spring is fastened to a tooth which protrudes outward with respect to the profile defined by the sliding body. Also, the device has a half-hull, is opened on one side and is associated with an ear-piece, and on the inside of the half-hull the sliding body, including the spring, is inserted. As a result, the tooth on the longitudinal surface acts as a stop reference. Being in a traction condition, the articulation causes the body to slide on the inside of the half-hull while causing the tooth to constantly grip along the base of the half-hull to compress the spring, and therefore recall elastically the articulation itself.

It is also very common to fasten to the box, preassembled, on the end of the ear-piece, an elastic yielding group consisting of an articulation on which is screwed a tie-rod coaxial to a spring and fastened on the opposite side by a suitable bushing. As a result, it is possible to notice at least two drawbacks, the need for an adequate size, which influences the weight of the structure, aesthetics not excluded, and the use of screws which involve considerable assembling time, and therefore considerable costs. For some ear-pieces, this device is considered valuable and the system is still valid, as seen by its wide use, but for the others, directed to a wider public, the device would not be any more convenient, because of the high costs of the frame. Continuous research in the field, in recent years, was therefore directed towards alternative devices, designed for being produced in a great quantities and mainly able to obviate the use of the spring passing the box for the fastening of the elastic yielding group.

It is also known that the French Patent n. 2 517 080 describes a hinge for a spectacles frame, in which a metal core is one with the articulation hinged to the front face. The core is placed, passing from one side to the other, coaxial to a box, and near one end of the box, a housing is provided that is able to contain an helicoidal compression spring. One side of the helicoidal compression spring is positioned in abutment to an annular edge obtained through a working internal to the box, and the other side of the helicoidal compression spring is positioned on the end partially inserted inside the box and which covers the end of the core. The effect obtained by opening the era-piece, consists of the coaxial sliding of the end with respect to the box containing the device. The drawbacks of this latter solution include of the fact that some complex components are still required, which make manufacturing and assembling particularly difficult, not excluding some manufacturing costs which would considerably affect the finished product.

Also in the prior art are other known improved elastic yielding devices, which are derived more or less from the previously described solutions, and which exhibit some of the problems related to the large size of the articulation.

The fact is that elasticizing devices are particularly bulky and unpleasant to see because the ear-piece shape limits and conditions the device's application. Another negative aspect commonly noticeable in the above-mentioned solutions, includes the fact that it is not possible to combine the already finished device directly with the ear-piece and instead involve rather long assembling times. Finally, the traditional ear-pieces have a tie-rod which, because of its shape, allows for excessive slack being inclined as a torsion, that is not much liked by the consumer. The purpose of this invention is to obviate the above-mentioned drawbacks.

Similar elastic hinging solutions are disclosed in DE2948113A (double spring box solution); FR2097211A (spring box solution), EP0462936A (double spring box solution); and EP0239011A (spring box solution).

In addition, FR-A-2702573 discloses a resilient hinge for a spectacle frame comprising a box (12) housing a spring (40) in abutment on the box (12) on the hinge side; the other end of the spring being in a toothed-end (31) of a L-shaped hinge element (30) inserted in the box. This solution requires a complicated mechanism consisting of: an axial guide means (42) for the spring (40); and the axial guide means (42) having a pyramidal square-head (44–45,46), abutting against a V-shaped anvil (50–58) with a tooth (52–54) that engages with a notch (14) contained in the box (12–18) that includes the respective spring (40).

A proposal of the same applicant consisted of a device, particularly reduced, for the elasticizing of an ear-piece for spectacles, comprising a small box being combined with an ear-piece by spot-welding and pre-assembly. Two springs are housed inside the box, each of the springs having one side being in abutment on the bottom of the small box and the other side being placed in abutment with an end of a tie-rod. The tie-rod is essentially "T" like and one of the two springs is placed on each side of the end of the tie-rod. The tie-rod has an opposite end that is provided with a suitable hole and is hingeable to a corresponding small front face provided on the frame of the spectacles. Another purpose of this invention is that of improving this solution in combination with the teaching of FR-A-2702573, but in which the features of the mechanism are less complicated and less expensive.

SUMMARY OF THE INVENTION

This and other purposes are reached with the present invention according to the characteristics stated in claim 1 by an ear-piece with an elastic hinging device for spectacles, comprising a box, inside of which are housed at least two springs. The springs are on a hinging side being retained by the box, and on the opposite side being abutted against a "L" shaped toothed-end of a tie-rod hinge. The small box is welded to the ear-piece in order to realize a fully operative, pre-assembled box with the ear-piece. Inside of the box is the respective "L" shaped toothed-end of the tie-rod hinge which is placed with its opening against the ear-piece surface in order for the springs to be encased and guided inside the "L" shaped toothed-end tie-rod hinge and the surface of the ear-piece.

The hinging side wall of the box comprises a guide seat, and at both sides of the guide seat, abutment faces, each abutment face being arranged for abutment of a respective one of the springs to guide and allow sliding of a hinge extension of the tie-rod hinge.

In such way, through considerable creative contribution and whose effect represents immediate technical progress, many advantages are obtained. First, a substantial reduction of size, mainly with regard to length, is obtained. Besides having a considerable aesthetic advantage, the invention allows for the widening of the range of tie-rods on which the device can be used. A second important advantage is that because of the particular "L" like shape of the tie-rod directed against the ear-piece, negative slacks, mainly torsion ones, very common in the linear mono-elastic tie rods are avoided, diminishing component wear. With regard to production of the device, an advantage is that the device is completed before being combined with the ear-piece, and therefore, combined to the ear-piece with a substantial reduction of manufacturing time and cost.

In conclusion, there will be a considerable functionality-price ratio benefit, making possible the use of the elastic yielding device in a great number of spectacles, thus widening the base of possible consumers.

These and other advantages will appear from the following detailed description of preferred embodiments with the aid of the enclosed schematic drawings whose manufacturing details are not to be considered as restrictive, but only as examples.

BRIEF DESCRIPTION OF THE DRAWINGS

FIG. 3 is a sectional top view of the device of the previous figures in its operating condition;

FIGS. 4 and 5 represent a bottom and side view of the small box, respectively, as a part of the elastic yielding device; and FIGS. 6 and 7 represent views of two sides of a tie-rod having an end shape of an "L" like type.

DETAILED DESCRIPTION OF THE INVENTION

Figure 1:
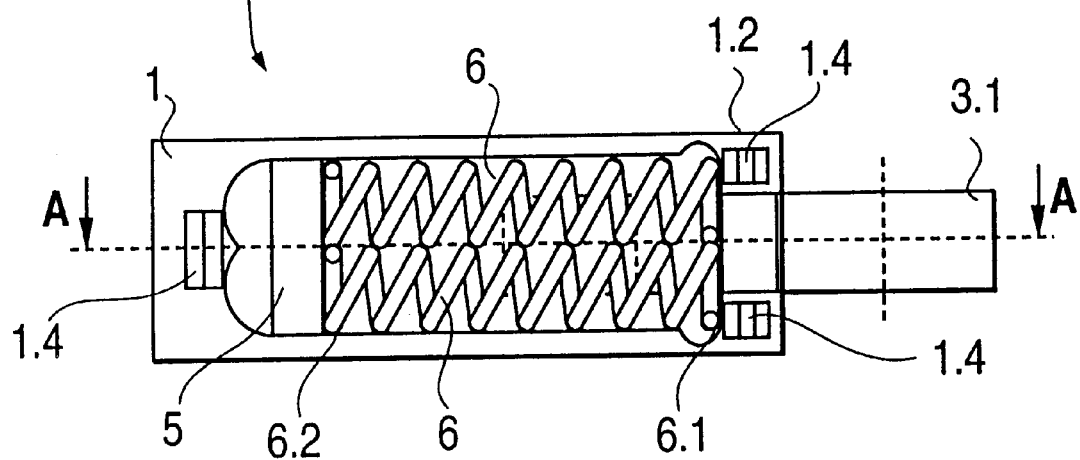
FIG. 1 represents a full view as seen from an open side of a small box of a main part of an elastic yielding device, to be combined with a corresponding tie-rod and ear-piece.
Figure 2:
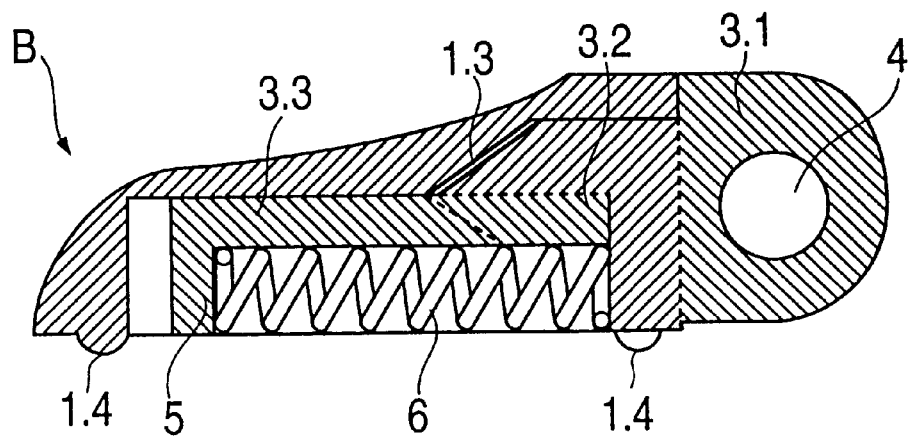
FIG. 2 represents a longitudinal section view of the device of FIG. 1 seen respectively along the axis A—A.

Referring to the figures, it can be seen that an ear-piece (A), particularly for spectacles, is elastically yielding for allowing, when the spectacles are worn, the opening of the ear-piece (A) beyond the common opening axis which is generally perpendicular with respect to a frame (D). In more detail, each metal ear-piece (A) of the spectacles, provides as combined on a flat side, and in correspondence with one end, an elastic yielding device (B), which interacts with a small front face (C), and in turn is engaged with the spectacles frame or front frame (D). The elastic yielding device (B) consists of a small box (1), having a rather contained size, and an open side (1.1) on a fixing side on the corresponding ear-piece (A). Along a perimetrical edge of the small box (1), always on the open side (1.1), are provided three coplanar abutments for two elastic springs (6), two coplanar abutments in the front part (hinging direction -4-) and only one coplanar abutment in the opposite back part, the one coplanar abutment in the opposite back part for encasing an end section (5) of a tie-rod hinge (3). The abutments or teeth are realized as welding protrusions (1.4), and after encasing the tie-rod hinge (3) and springs (6) spot welding by electro-welding with the part of the ear-piece (A) is performed allowing for the definite and steady fastening of the small box (1), and therefore of the device (B). A second characteristic of the small box (1), is that a longitudinal opening as a cutout (2) is provided which has an edge in correspondence with the front part, and which creates two perpendicular abutment faces or walls (1.2) with respect to an upper surface (2.2). The purpose of the opening or cutout (2), is to allow the axial guide of the tie-rod (3), the tie-rod being in part housed inside of the small box (1), and in part protruding from the small box (1) through a flat surface (3.1) that is to be hinged to the small front face or hinge portion (C) of the spectacles (D). The flat surface (3.1) of the tie-rod (3) provides a rounded edge and a central hole (4) for the hinging of the ear-piece (A) and the device (B) to the small front face (C), while on the opposite side of the tie-rod, the portion of tie-rod that is housed inside of the device (B) includes a flat surface (3.3) turned 90° with respect to the front part (3.1), and which is followed by the end section or wing (5) perpendicularly folded with respect to the flat surface (3.3). This arrangement therefore forms a typical "L" like shape. An intermediate part of the tie-rod (3) consists of a portion (3.2), which provides an oblique section which, together with the sloping surface (1.3) of the small box (1) form a end-stroke of the tie-rod (3).

The portion (3.2), is a copy of the shape of the guide seat (2) obtained in the small box (1), and during non-operating conditions the portion (3.2) keeps the springs slightly stressed, thus avoiding any slack in the tie-rod (3). During assembly, it is thus possible to insert into the small box (1), first the tie-rod (3) and then the springs (6), or all of these together, by slightly forcing them into the housing.

The wing (5) is obtained monolithically from the tie-rod (3), allowing for a lateral housing to be defined, inside of which, in contact with the flat surface (3.3) is housed the helicoidal springs (6) which are parallel and adjacent. In even more detail, both springs (6) are placed with one end (6.1) in abutment on the bottom of the front part of the small box (1), while an opposite end (6.2) is in abutment on the corresponding wing (5). By exerting an axial traction of the tie-rod (3), a condition like the opening of the ear-piece (A) beyond the usual opening angle is obtained as is a compression of both springs (6), which contrasts the action. As a consequence, the ear-piece (A) hinged to a corresponding front face (C) will yield elastically with respect to the front of the frame (D), pulling the tie-rod (3) and contemporaneously compressing the springs (6) which are internally pushed towards the shoulder of the front part of the small box (1).

Thus, the natural extension of the springs (6) allows the spectacles to be properly and softly worn by modulating the pressure exerted by the ear-pieces on the temples, and then, when the spectacles are no longer being used, allows the ear-pieces to return to a static condition.

What is claimed is:

1. An ear-piece assembly for spectacles, the ear-piece assembly comprising:
   an ear-piece;
   a box having a hinging side wall, a guide seat and two abutment faces located on either side of said guide seat, said box being welded to said ear-piece;
   a tie-rod hinge having first and second ends, said first end of said tie-rod hinge being substantially "L" shaped and slidably contacting said hinging side wall inside said box and said second end of said tie-rod hinge being located outside said box; and
   at least two springs located within said box, each of said at least two springs having first and second ends, wherein said first end of each of said at least two springs is in abutment with a respective one of said two abutment faces and said second end of each of said at least two springs is in abutment with said first end of said tie-rod hinge.

2. An ear-piece assembly of claim 1, wherein said at least two springs comprises two springs, said two springs located adjacent and parallel with each other and said tie-rod hinge.

3. An ear-piece assembly of claim 2, wherein said tie-rod hinge further comprises:

a front hinging part attached to said second end of said tie-rod hinge, said front hinging part being operable to connect the ear-piece to a front frame of the spectacles; and
   an intermediate part located between said first and second ends of said tie-rod hinge, the intermediate part comprising:
      an intermediate portion being operable to slide between said abutment faces, and
      an oblique section being operable, with a sloping surface of said box, to form an end stroke of said tie-rod hinge.

4. An ear-piece assembly of claim 3, wherein said substantially "L" shaped first end of said tie-rod hinge comprises:
   a straight section slidably contacting said hinging sidewall; and
   an end section substantially perpendicular to said straight section, said end section having at least two concave areas for placement of each of respective said second ends of said at least two springs.

5. An ear-piece assembly according to claim 4, comprising two ear-piece assemblies connected to a front frame of the spectacles.

6. An ear-piece assembly according to claim 2, comprising two ear-piece assemblies connected to the front frame of the spectacles.

7. An ear-piece assembly of claim 1, wherein said tie-rod hinge further comprises:
   a front hinging part attached to said second end of said tie-rod hinge, said front hinging part being operable to connect the ear-piece to a front frame of the spectacles; and
   an intermediate part located between said first and second ends of said tie-rod hinge, the intermediate part comprising:
      an intermediate portion being operable to slide between said abutment faces, and
      an oblique section being operable, with a sloping surface of said box, to form an end stroke of said tie-rod hinge.

8. An ear-piece assembly of claim 7, wherein said substantially "L" shaped first end of said tie-rod hinge comprises:
   a straight section slidably contacting said hinging sidewall; and
   an end section substantially perpendicular to said straight section, said end section having at least two concave areas for placement of each of respective said second ends of said at least two springs.

9. An ear-piece assembly according to claim 1, comprising two ear-piece assemblies connected to a front frame of the spectacles.

10. An elastic hinging device for connecting ear-pieces to a front frame to form spectacles, the hinge device comprising:
   a box having a hinging side wall, a guide seat and two abutment faces located on either side of said guide seat;
   a tie-rod hinge having first and second ends, said first end of said tie-rod hinge being substantially "L" shaped and slidably contacting said hinging side wall inside said box and said second end of said tie-rod hinge being located outside said box; and
   at least two springs located within said box, each of said at least two springs having first and second ends, wherein said first end of each of said at least two springs is in abutment with a respective one of said two abutment faces, and said second end of each of said at least two springs is in abutment with said first end of said tie-rod hinge.

11. An elastic hinging device of claim 10, wherein said at least two springs comprises two springs, said two springs located adjacent and parallel with each other and said tie-rod hinge.

12. An elastic hinging device of claim 11, wherein said tie-rod hinge further comprises:

a front hinging part attached to said second end of said tie-rod hinge, said front hinging part being operable to connect the ear-piece to a front frame of the spectacles; and an intermediate part located between said first and second ends of said tie-rod hinge, the intermediate part comprising:

an intermediate portion being operable to slide between said abutment faces, and an oblique section being operable, with a sloping surface of said box, to form an end stroke of said tie-rod hinge.

13. An elastic hinging device of claim 12, wherein said substantially "L" shaped first end of said tie-rod hinge comprises:

a straight section slidably contacting said hinging sidewall; and an end section substantially perpendicular to said straight section, said end section having at least two concave areas for placement of each of respective said second ends of said at least two springs.

14. An elastic hinging device according to claim 13, comprising two elastic hinging devices connecting two ear-pieces to the front frame of the spectacles.

15. An elastic hinging device according to claim 11, comprising two elastic hinging devices connecting two ear-pieces to the front frame of the spectacles.

16. An elastic hinging device of claim 10, wherein said tie-rod hinge further comprises:

a front hinging part attached to said second end of said tie-rod hinge, said front hinging part being operable to connect the ear-piece to a front frame of the spectacles; and an intermediate part located between said first and second ends of said tie-rod hinge, the intermediate part comprising:

an intermediate portion being operable to slide between said abutment faces, and an oblique section being operable, with a sloping surface of said box, to form an end stroke of said tie-rod hinge.

17. An elastic hinging device of claim 16, wherein said substantially "L" shaped first end of said tie-rod hinge comprises:

a straight section slidably contacting said hinging sidewall; and an end section substantially perpendicular to said straight section, said end section having at least two concave areas for placement of each of respective said second ends of said at least two springs.

18. An elastic hinging device according to claim 10, comprising two elastic hinging devices connecting two ear-pieces to the front frame of the spectacles.

* * * * *